United States Patent
van Doren et al.

(10) Patent No.: US 7,490,178 B2
(45) Date of Patent: Feb. 10, 2009

(54) THRESHOLD ON UNBLOCKING A PROCESSING NODE THAT IS BLOCKED DUE DATA PACKET PASSING

(75) Inventors: Egidius Gerardus Petrus van Doren, Lommel (BE); Hendrikus Christianus Wilhelmus van Heesch, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/555,831

(22) PCT Filed: Apr. 29, 2004

(86) PCT No.: PCT/IB2004/001447

§ 371 (c)(1),
(2), (4) Date: Nov. 7, 2005

(87) PCT Pub. No.: WO2004/099983

PCT Pub. Date: Nov. 18, 2004

(65) Prior Publication Data

US 2007/0008983 A1    Jan. 11, 2007

Related U.S. Application Data

(60) Provisional application No. 60/469,068, filed on May 8, 2003.

(51) Int. Cl.
*G06F 3/00* (2006.01)
*G06F 5/00* (2006.01)
*G06F 9/00* (2006.01)
*G06F 15/167* (2006.01)

(52) U.S. Cl. ............................. 710/52; 710/29; 710/57; 710/58; 712/225; 712/228; 712/229; 709/213

(58) Field of Classification Search ....................... None
See application file for complete search history.

(56) References Cited

OTHER PUBLICATIONS

Kevin Jeffay; "The Real-Time Producer/Consumer Paradigm: A Paradigm for the Construction of Efficient. Predictable Real-Time Systems", Proceedings of the 1193 ACM-SIGAPP Symposium on Applied Computing, Mar. 1993, pp. 796-804; XP002293835.
J. B. Carter et al; "Techniques for reducing consistency-Related Communications in Distributed Shared-Memory Systems", ACM Transactions on Computer Systems, Association for Computing Machinery, NY, vol. 13, No. 3. Aug. 1, 1995, pp. 205-243, XP000558452.

*Primary Examiner*—Alford W Kindred
*Assistant Examiner*—Richard Franklin

(57) ABSTRACT

A threshold mechanism is provided so that a producer and a corresponding consumer, executing on the same resource (e.g., CPU) are able to switch context between them in a manner that reduces the total number of such context switches. The threshold mechanism is associated with a buffer into which the producer stores packets up to a given threshold before the consumer is allowed to remove packets. The buffer has an associated upper limit on the number of packets that can be stored in the buffer. A flush empties the buffer of any remaining packets when no more packets are to be produced. This reduction in the total number of context switches in general leads to better performance at the cost of more latency.

14 Claims, 2 Drawing Sheets

THRESHOLD ON UNBLOCKING A PROCESSING NODE THAT IS BLOCKED DUE DATA PACKET PASSING

CROSS REFERENCE TO RELATED APPLICATION

This application claims the benefit of U.S. provisional application Ser. No. 60/469,068 filed May 8, 2003 which is incorporated herein in whole by reference.

This invention relates to a threshold for controlling the exchange of data packets between a producer and a consumer residing on the same CPU. More particularly, the invention relates to software streaming based on a graph of processing nodes, and is a system and method for a threshold to unblock a processing node that is blocked due to data packet passing between two processing nodes residing on the same CPU.

Software streaming is based on a graph of processing nodes, where the communication between the nodes is done using discrete packets of data. Nodes actively transport packets from their input edges to their output edges, making the data flow through the graph. Each packet follows a certain route through the graph, starting at a source node and ending at a sink node.

Two processing nodes running on the same resource (e.g. CPU), cannot run in true parallel. Instead, the resource switches between the execution of the two nodes. This is called a context switch. A context switch is relatively expensive due to the fact that all registers have to be saved, and on a CPU with a cache it is far more expensive since the cache will be thrashed (no locality any more due to the switch).

When two communicating processing nodes (producer, consumer) run on the same resource and the producer produces a packet, a context switch is required, before the consumer can consume this packet. When a context switch is done after each packet, two context-switches (back and forth) are required for each packet. To reduce the context switches there are several options to tune a system when constructing the streaming graph:

Increase the packet size, and thus reduce the frequency of producing packets. This option has the disadvantage that both the producer and consumer must be able to handle parameterized packet sizes. This increases the complexity of the nodes.

Let the producer produce a number of packets, before switching to the consumer.

Give the producer a higher priority than the consumer. The producer will continue until it cannot make progress any more. The reason is usually that no empty packets are available any more to be filled and sent to the consumer. Then, the consumer can start. However, as soon as the consumer has consumed one packet and releases the packet so that it is again available for reuse, the producer will be activated immediately since there is again an empty packet and the producer has a higher priority than the consumer. So giving the producer a higher priority does not, in most cases, solve the problem. Furthermore, priorities are for the control responsiveness and should not be used for this context switch problem.

Give the producer and consumer equal priority. These will typically be handled in a round robin fashion. The context switches will be limited, depending on the time slice used by the Operating System. However, giving tasks the same priority has a negative impact on their worst case behavior (worst-case response). So, this option is a trade-off between the context-switch overhead and the cost of a worse response.

A threshold mechanism that prevents the consumer from starting consumption immediately when a packet is produced by the producer. And, in addition a threshold mechanism such that when a consumer releases a packet to be reused again, the producer cannot immediately consume that packet, i.e., must wait until the amount of packets has reached the threshold.

A general disadvantage of all the options described above is that the end-to-end latency will increase, which is also true for the threshold mechanism.

The basic threshold mechanism is that a blocked consumer is unblocked when a certain threshold (of available packets) is reached. A threshold of 5 (only informs the consumer that there are again packets when 5 packets are available), can reduce the number of context switches with about the same factor (5).

The mechanism is used when the consumer is blocked, i.e. the consumer previously tried to get a data packet but it failed. In case the consumer is not blocked on the data packet input and the threshold of 5 is reached the mechanism is not used. The threshold mechanism is independent of the processing nodes, i.e. a processing node does not know whether a threshold is used and what value it has. A system integrator can configure the thresholds during integration.

However, the threshold mechanism has several disadvantages:

A threshold that is too high can result in a deadlock situation; and

In case no data packet is produced, remaining data packets (under the threshold limit) may not be consumed since the consumer is not notified that there are still some packets In summary, the present state of the art with regard to thresholds for limiting context switches is:

Thresholds in general, as described above;

Data packet passing;

Data packet synchronization; and

Callback functions are invoked when a data packet threshold is used.

The threshold mechanism of the present invention is an effective means for reducing the number of context switches that are the result of the data packet passing that occurs on a given processor. A reduction in the number of context switches leads to a more effective use of the processor. The threshold mechanism of the present invention is invisible to the processing nodes, i.e. no additional complexity inside the nodes is required.

The present invention addresses the disadvantages noted above by providing thresholds on unblocking a blocked processing node to reduce the context switch overhead. In addition, the present invention can be extended by mechanisms that prevent deadlock or data that gets stuck in the buffer. Example extensions are a timeout on a threshold that determines the maximum time a threshold can delay the notification to the consumer, or an additional task in the system with a low priority that removes all thresholds in case the system becomes 'idle'.

FIG. 1 illustrates a low priority producer component 100 connected to a high priority consumer component 110 via buffer component 120.

The system and method of the present invention reduces the number of context switches that are the result of passing packets to higher priority streaming components in a system with a pre-emptive priority based scheduler. A reduction of the number of context switches in general leads to better performance at the expense of an increase in latency.

In a preferred embodiment, a buffer threshold is a mechanism that postpones signaling a consumer component that is blocked waiting for packets until sufficient packets are available in the buffer, i.e., the threshold amount of packets are present in the buffer. When the threshold of a buffer is set to x, the waiting, i.e., blocked, component associated with that buffer is signaled only when x packets are available in the buffer.

Figure 1:
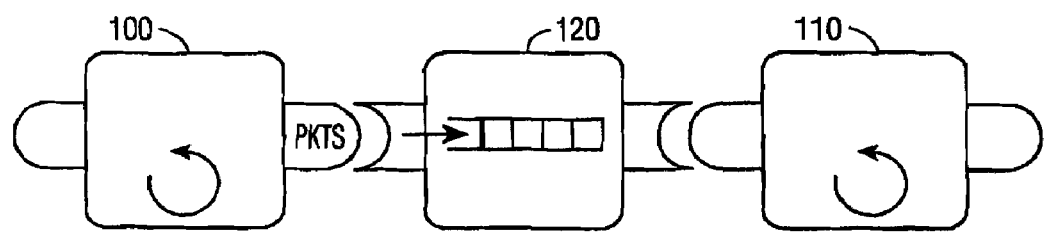
Figure 2:
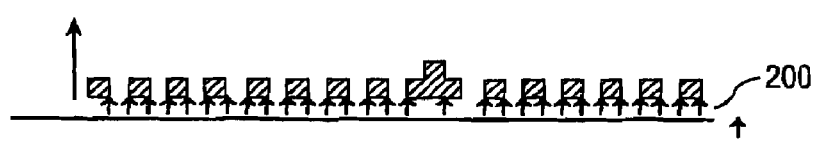
FIG. 2a illustrates context switches 200 and buffer filling for the low priority producer component producing buffers for the high priority consumer component of FIG. 1 when no threshold is used.
FIG. 2b illustrates context switches 210 and buffer filling for the low priority producer component producing buffers for the high priority consumer component of FIG. 1 when a threshold of 5 is used.
Figure 2:
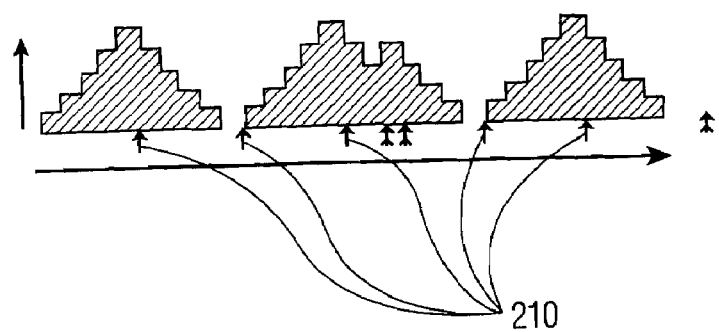

FIG. 1 illustrates a low priority producer component 100 connected to a high priority consumer component 110 via a buffer component 120, all on the same processor. FIG. 2a depicts the filling of the buffer component 120 of FIG. 1 when data packets are passed, i.e., produced and consumed right away. That is, when the producer component 100 puts a packet in buffer 120, component 100 will be preempted immediately by the consumer component 110 (assuming that consumer component 110 is ready to run). When the consumer component 110 is ready and again waits for new input, producer component 100 is resumed. As illustrated in FIG. 2a, the number of context switches 200 as a result of this communication depends on the frequency of passing packets. FIG. 2b illustrates the same situation except the buffer has an associated threshold of 5. The number of context switches 210 is reduced by a factor that is almost equal to 5. This reduction occurs because consumer component 110 first consumes all 5 available packets in a burst and then waits for new input, whereupon producer component 100 resumes. Producer component 100 can produce 5 packets before it is pre-empted by consumer component 110. The irregularity in both FIGS. 2a and 2b is caused by consumer component 110 not being ready to run for some reason when it is signaled that full packets are available in a buffer, e.g. there is no empty packet for the result of consumer component 110.

Packets in buffers are not available for the consuming component as long the threshold associated with that buffer has not been reached. It is possible, e.g. due to end of file on the producer input, that packets placed in the buffer component 120 by the producer component 100 do not become available to the consuming component 110. In this case additional precautions have to be taken to guarantee that those packets remaining in the buffer 120 are flushed (i.e., processed by the consumer).

Precautions are required so that using a buffer threshold that is too high does not result in deadlock, e.g., the number of packets produced is insufficient to reach the buffer threshold. A basic example is that if 4 packets are circulating through a system, setting a threshold to 5 will result in a system that locks-up, since the threshold is never reached. So a basic rule is that the threshold value should be equal or lower than the amount of packets that is produced. In more complex systems, where the availability of a packet depends on the availability of other packets, this simple rule may not suffice, and more complex rules that take multiple thresholds into account are required.

In addition, the choice of a buffer threshold value should minimize the increase in latency of a chain that results from the use of the threshold. In nearly all cases it is desirable to have a low latency (e.g. audio may only be delayed a couple of milliseconds before the end-user starts noticing it), so even if there are 10 packets circulating in a system, which would allow a threshold value of 10, the low latency requirement may dictate a lower threshold setting, which is sub optimal with respect to context switch overhead.

Figure 3:
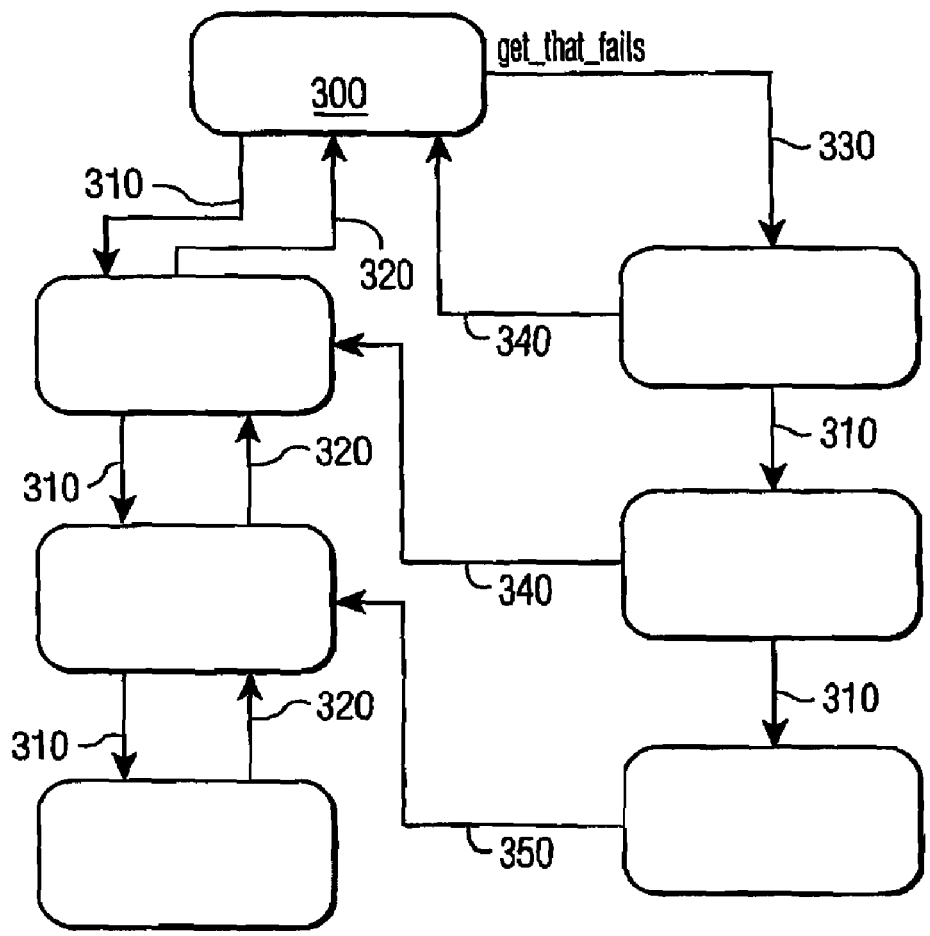
FIG. 3 illustrates a state transition diagram for an embodiment of the present invention having a threshold of two associated with a buffer that can hold three packets.

Initially a buffer threshold is not active. In case components are blocked, or an end of file is reached, a special command packet is sent through the chain to flush the packets held by the buffer components. The possible states for a buffer, which can hold three packets and has its threshold set to two is illustrated in FIG. 3. The following state transitions are possible:

put 310: a packet is added to the buffer by the sender
get 320: a packet is successfully removed from the buffer by the receiver
get_that_fails 330: the consumer tries to obtain a packet from the buffer but fails because the buffer is empty. This activates the threshold mechanism.
flush 340: a flush command deactivates the threshold, so the consumer can obtain packets even though the threshold was not reached.
notify consumer 350: the threshold has been reached, and the consumer is notified that it can start getting packets from the buffer.

Context switches are prevented because after the get_that_fails transition, the consumer is not scheduled until it is notified that there are two packets in the buffer. The state diagram can be extended in a straightforward manner to include larger buffers and higher threshold values.

Although the embodiments of the invention described herein are preferably implemented as software, all or some of the embodiment discussed above can be implemented using discrete hardware elements and/or logic circuits.

In this regard, the present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

The invention claimed is:

1. An apparatus, including a processor, for controlling a switch of context between an execution context of a producer of a packet and an execution context of a consumer of the packet, comprising:

a buffer for storage said packet produced by said producer and removal of said packet by said consumer;
a count for incrementing and decrementing, respectively responsive to storage of said packet in the buffer and removal of said packet from the buffer;
a threshold imposed on said count, said threshold having a threshold pre-set value and an on and off state;
a limit on the count, said limit having a limit pre-set value;
a first means for
  (a) delaying said producer from a switch of said producer context to the execution context of the consumer if said threshold is on and said count is less than the pre-set value of the threshold, wherein said first means set the threshold off before said producer context is switched, and
  (b) stopping said delaying said producer from a switch of said context to the execution context of the consumer if said threshold is on and a buffer flush is required to allow the consumer to process any remaining packets in the buffer, wherein said first means set the threshold off before said context is switched;

if said count is zero, a second means for setting said threshold on and forcing said context switch to said producer.

2. The apparatus of claim 1, wherein said pre-set value of the limit is greater than the pre-set value the threshold.

3. The apparatus of claim 1, wherein the first and second means are implemented as software.

4. The apparatus of claim 1, wherein the first and second means are implemented as control logic.

5. The apparatus of claim 1, wherein said first and second means are a priority based scheduler; and said producer has a higher priority than said consumer.

6. The apparatus of claim 5, wherein said pre-set value of the limit is greater than the pre-set value the threshold.

7. The apparatus of claim 5, wherein the priority based scheduler is implemented in software.

8. The apparatus of claim 5, wherein the priority based scheduler is implemented as control logic.

9. An apparatus, comprising a processor, for controlling production of packets by a producer and consumption of said packets by a consumer, comprising:

buffer storage for storing packets therein, said buffer having a threshold and a limit imposed on the number of packets stored in said buffer, said threshold and said limit having respective pre-set values, and said threshold having an on and off state;

control logic;

wherein, when said threshold is off said control logic causes the producer to produce and store at least one of said packets in said buffer storage and allows a context switch to the consumer;

wherein, when said threshold is on, said control logic causes the producer to produce and store at least one of said packets in said buffer storage and delays the context switch to the consumer until a number of packets stored in said buffer storage is equal to said threshold and then said control logic sets said threshold off and allows the context switch to the context of the consumer;

wherein, when said threshold is on and a buffer flush is required, said control logic sets said threshold off and allows a switch to the execution context of the consumer to process any remaining packets in the buffer; and wherein when said buffer is empty, said control logic sets said threshold on and forces a context switch to the producer.

10. The apparatus of claim 9, wherein said pre-set value of the limit is greater than the pre-set value the threshold.

11. A method of controlling a switch of a context between a context of a producer of a packet and a context of a consumer of said packet, said method operable on a processor comprising:

providing a threshold and limit for a number of packets produced, said threshold and limit having respective pre-set values, said threshold having an on and off state;

when the context is the context of the producer and said threshold is off, said producer performing the step of producing packets, while allowing said switch of the context to the context of the consumer;

when the context is the context of the producer and said threshold is on, said producer performing (a) producing threshold number of packets, while not allowing the switch of the context to the context of the consumer, and (b) when threshold number of packets have been produced, setting the threshold off; and when the context is the context of the consumer, said consumer performing (c) consuming packets produced by the producer, (d) when there are no more packets to be consumed, performing setting the threshold on, and switching the context to the context of the producer.

12. The method of claim 11, wherein said pre-set value of said limit is greater than said pre-set value of said threshold.

13. The method of claim 11, further comprising providing a buffer for storing packets produced by said producer; and storing said produced packet in said provided buffer.

14. The method of claim 13, wherein said pre-set value of said limit is greater than said pre-set value of said threshold.

* * * * *